Figure 1:
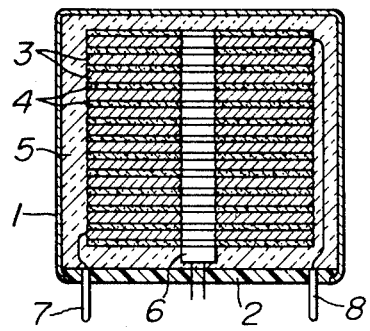

United States Patent

[11] 3,607,414

[72] Inventors Hiroshi Kumano
 Daito-shi;
 Yoshimi Omukai, Hirakata-shi; Hiroshi Yamasaki, Neyagawa-shi, all of Japan
[21] Appl. No. 783,917
[22] Filed Dec. 16, 1968
[45] Patented Sept. 21, 1971
[73] Assignee Matsushita Electric, Industrial Co., Ltd.
 Oaza Hadoma, Kadoma-Shi
 Osaka, Japan
[32] Priority Dec. 19, 1967
[33] Japan
[31] 42/82460

[54] THERMAL BATTERY
 6 Claims, 2 Drawing Figs.
[52] U.S. Cl. .................................................. 136/83 T,
 136/137, 136/153
[51] Int. Cl. ......................................................H01m 21/14

[50] Field of Search........................................... 136/83,
 137, 153

[56] References Cited
 UNITED STATES PATENTS
| | | | |
|---|---|---|---|
| 3,361,596 | 1/1968 | Senderoff et al.............. | 136/83 X |
| 3,367,800 | 2/1968 | Panzer.......................... | 136/83 |
| 3,404,037 | 10/1968 | McCarter...................... | 136/83 |
| 3,421,941 | 1/1969 | Osborne et al................ | 136/83 |
| 3,510,357 | 5/1970 | Nielsen......................... | 136/83 X |

Primary Examiner—Donald L. Walton
Attorney—Stevens, Davis, Miller & Mosher

ABSTRACT: A thermal battery in which a salt of an oxyacid of a halogen having a valency of I, III, V or VII and an alkali metal or alkaline earth metal is added to a depolarizer or an electrolyte, and which has an increased discharge capacity, a flat discharge voltage and a decreased internal resistance.

PATENTED SEP 21 1971

3,607,414

INVENTORS
HIROSHI KUMANO,
YOSHIMI OMUKAI, HIROSHI YAMASAKI
BY Stevens, Davis, Miller & Mosher
ATTORNEYS

THERMAL BATTERY

The present invention relates to a thermal battery characterized by a perchlorate of halogen added to a depolarizer or an electrolyte. The invention has for its object the provision of a thermal battery which is particularly excellent in three respects, i.e., discharge capacity, safety of voltage during constant load discharge and stability of voltage during discharge under variable load conditions.

Conventional thermal batteries include those in which use is made of a fused salt as electrolyte and those in which use is made of a solid electrolyte, and either of these type is activated at elevated temperatures, e.g., at 400° C., supplying a desired output to the outside, though they are incapable of supplying a practical output at normal temperature. In the practical use of these thermal batteries it is convenient to charge a suitable heat source in the container along with unit cells so as to heat the unit cells to the activation temperature by said heat source when the batteries are to be used.

Thermal batteries which are adapted for use in the case where a high output is required in a short period of time, have such advantageous features that they are small in size and light in weight, that their shelf lives are long, that is, they can be reserved, for instance, for 5 years or even longer without deterioration and yet without requiring any maintenance work and that they can be used in a temperature range, for example, from −70° To 100° C. without requiring any adjustment or care.

On the other hand, however, even a thermal battery is not entirely satisfactory in respect of stability of discharge voltage during discharge under a constant load condition, uniformity of voltage during discharge under varying load conditions and increasing the discharge capacity, which are always required for batteries, and these disadvantages have normally been regarded, not as apparent drawbacks of the thermal battery but rather as inevitable consequences.

The present invention, as will be understood from the following description, contemplates the provision of a thermal battery which is practically sufficiently satisfactory even in respect to the aforesaid properties.

Figure 2:
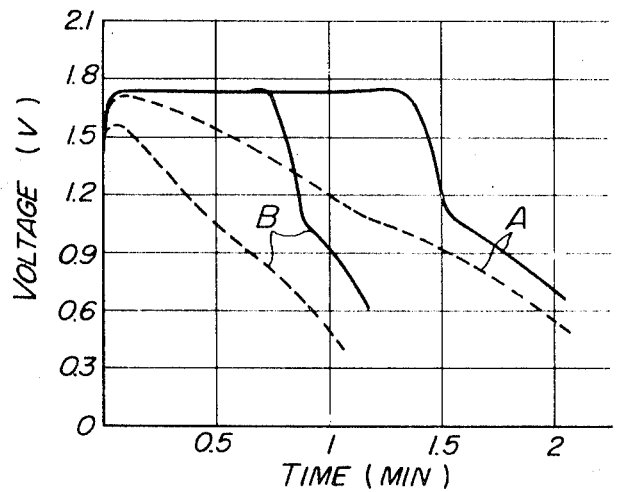

The present invention will be described now in detail in conjunction with the accompanying drawings, in which:

FIG. 1 is a vertical sectional view of an embodiment of the thermal battery according to the present invention, and FIG. 2 is a diagram graphically showing the discharge characteristics of the thermal battery.

Referring first to FIG. 1, an outer casing of the thermal battery is composed of a container 1 and a closure member 2. A unit cell 3, though not apparent in the Figure, is composed of an anode. An electrolyte. A depolarizing mixture and a cathode which are arranged in a manner known in the art, and the unit cell is in the shape of a flat ring on the whole.

Various materials are commonly used as constitutional elements of a unit cell but as a typical example of a unit cell which can be produced very easily and has excellent discharge characteristics, one may be mentioned in which magnesium is used as anode, an eutectic salt of calcium chloride and lithium chloride as electrolyte, a mixture of calcium chromate as a depolarizer and said electrolyte as depolarizing mixture, and nickel as cathode. It is to be noted, however, that the present invention is characterized by adding an addition agent to the aforesaid depolarizer or electrolyte, and in the embodiment of the invention shown, 5 percent of potassium perchlorate was added to the depolarizer. The total amount of depolarizer used, including the addition agent, is the same as that in the conventional unit cell.

A heat source 4 is a mixture consisting primarily, for example, of aluminum powder and barium peroxide powder. In producing the thermal battery, an amount of the mixture as required for heating the unit cell 3 to the activating temperature is molded and then the molded heat source is assembled with the unit cells in contact therewith. An insulator 5, consisting, for example, of asbestos, is provided for the purposes of maintaining the unit cells 3 at the activation temperature for a required period of time as well as for preventing the high temperature from directly affecting exterior materials causing damage thereto.

An ignitor 6 includes an extremely fine heater adapted to be incandesced by a pulse current conducted therethrough from the outside and a priming material, e.g., lead rhodanide, to be fired by said heater. Reference numerals 7 and 8 designate output terminals through which the output of the unit cells 3 is supplied to the outside.

When the thermal battery is being used, a pulse current is conducted through the ignitor 6 either directly or through remote control means. Thereupon the unit cells 3 are automatically heated to the activating temperature supplying the generated current to the outside through the output terminals. The period required for the thermal battery to supply a current after actuation of the ignitor is usually in the order of 1 to 3 seconds.

The thermal battery of the present invention is characterized in that it is very superior to the conventional one of a similar type in the three points mentioned previously. FIG. 2 shows the discharge characteristics of the above-described thermal battery embodying the present invention and the conventional one, wherein the solid lines represent the battery of this invention and the dotted lines represent the conventional one. Character A indicates the characteristic curves for a discharge current density of 200 mA/cm.$^2$ and B indicates the characteristic curves for a discharge current density of 400 mA/cm.$^2$.

As is apparent in the diagram of FIG. 2, the discharge curve of the battery according to the invention is flat, which means that the voltage during discharge of the battery under a given load condition is stable. It will also be noted that the voltage at the flat portion of the curve is also substantially the same when the load current being discharged is doubled. Namely, the battery of the invention enables a constant voltage to be obtained during discharge under varying load conditions. Furthermore, it will be noted that under the same load condition the discharge capacity of the present battery is increased drastically compared with that of the conventional one.

The reason why the present battery is so superior to the conventional one is not clearly understood, but it may be attributed to the following three points, namely that the depolarization capacity is increased by the use of an addition agent, that the rate of reaction is increased also by the use of the addition agent and that the reaction product of the addition agent acts effectively as part of the electrolyte.

The addition agents to be effectively used in the invention include, besides the potassium perchlorate mentioned previously, almost all salts of oxyacids of halogens the valences of which are I, III, V and VII with metals, particularly alkali metals, alkaline earth metals and lead. Namely, effects similar to those of the thermal battery exemplified above can also be obtained by the use, for example, of sodium perchlorate, calcium perchlorate, lead chlorate, potassium chlorate, sodium bromate and potassium iodate. The addition of the salt of oxyacid of halogen in an amount up to about 15 percent by weight of the depolarizing mixture is most effective.

Obviously, however use of such salts of oxyacids and metals should be avoided which will be decomposed intensely at temperatures below the fusing temperature of the electrolyte used, thereby scattering the effective constituents or producing a detrimental effect on the condition of the constituent elements in the unit cell, or which will react with the electrodes, the depolarizer and/or the electrolyte to deteriorate the same during use of the battery. The intended thermal battery of the invention can be obtained only by selectively using such an addition agent which has suitable properties relative to the constitutional elements of the unit cell used and the atmosphere in which the battery operates.

A similar effect can also be expected by adding these additional agents to the electrolyte beforehand and causing them to penetrate into the depolarizing mixture during operation of the battery (as the electrolyte is fused).

What is claimed is:

1. A thermal battery having a unit cell comprising an anode, an electrolyte, a depolarizing mixture and a cathode, said electrolyte being electrically nonconductive in the solid state but becoming ionically conductive upon being heated, said depolarizing mixture comprising a salt of oxyacid of halogen and at least one metal selected from the group consisting of alkali metals, alkaline earth metals and lead.

2. A thermal battery as defined in claim 1, in which said salt of oxyacid of halogen and metal is added in an amount of 15 percent or smaller of the depolarizing mixture.

3. A thermal battery as defined in claim 1 wherein said salt of oxyacid of halogen and metal comprises a halogen having a valence of I.

4. A thermal battery as defined in claim 1 wherein said salt of oxyacid of halogen and metal comprises a halogen having a valence of III.

5. A thermal battery as defined in claim 1 wherein said salt of oxyacid of halogen and metal comprises a halogen having a valence of V.

6. A thermal battery as defined in claim 1 wherein said salt of oxyacid of halogen and metal comprises a halogen having a valence of VII.